UNITED STATES PATENT OFFICE.

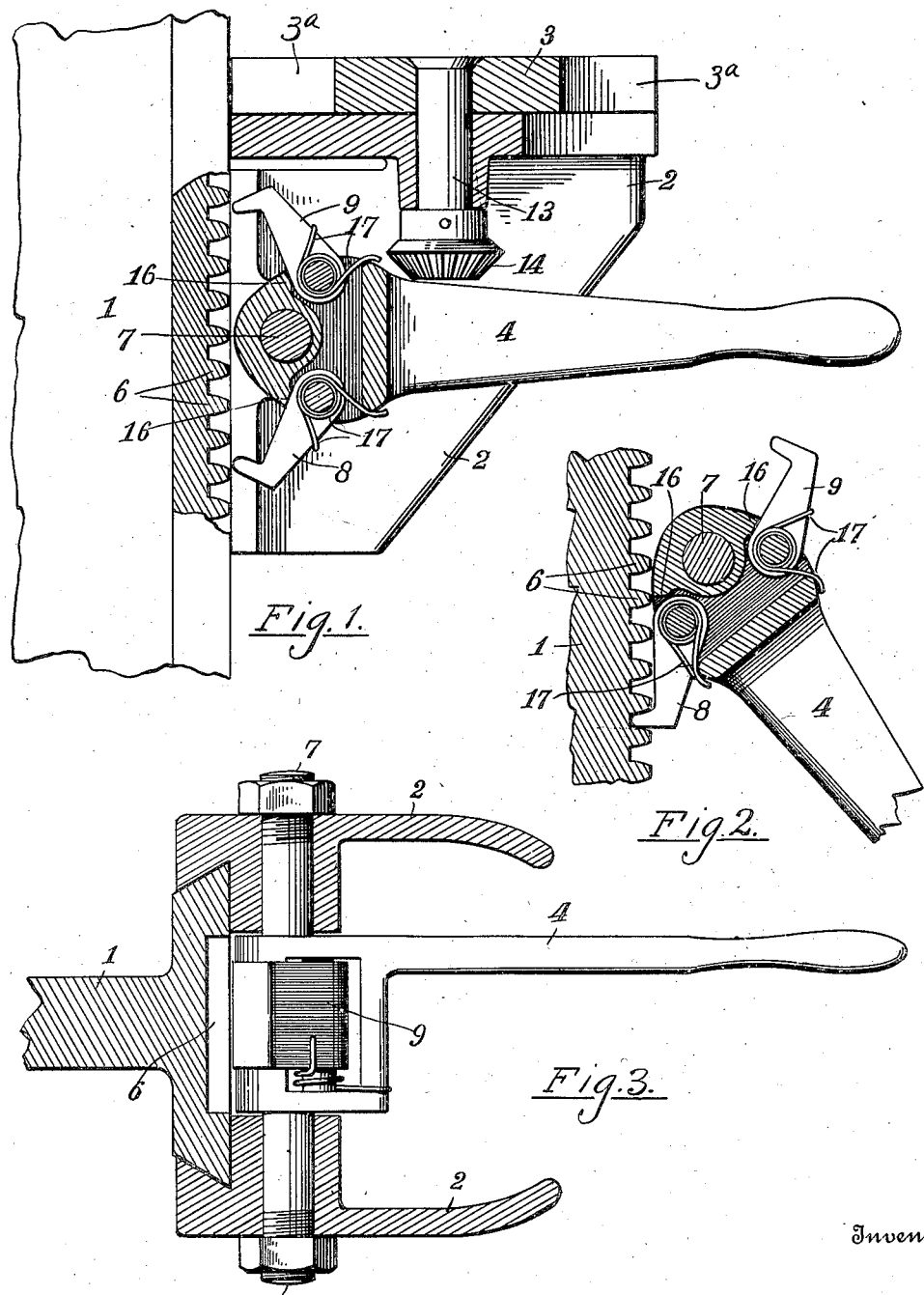

WILLIAM E. ELLIOTT, OF GRAND RAPIDS, MICHIGAN.

ARBOR-PRESS.

1,103,179.  Specification of Letters Patent.  Patented July 14, 1914.

Application filed July 15, 1912. Serial No. 709,419.

*To all whom it may concern:*

Be it known that I, WILLIAM E. ELLIOTT, a citizen of the United States of America, residing at Grand Rapids, in the county of Kent and State of Michigan, have invented certain new and useful Improvements in Arbor-Presses; and I do hereby declare the following to be a full, clear, and exact description of the invention, such as will enable others skilled in the art to which it appertains to make and use the same.

My invention relates to improvements in arbor presses and more particularly to the work supporting member commonly known as a knee or bracket, and its object is to provide improved means for adjusting the same on the frame and for supporting the work thereon, and to provide the device with various new and useful features hereinafter more fully described and particularly pointed out in the claims reference being had to the accompanying drawings in which:

Figure 1 is a detail in vertical section of the adjusting and locking mechanism in mid-position; Fig. 2 the same shown in operative position for locking the device in raised position; and Fig. 3 a horizontal section in detail of the same.

Like numbers refer to like parts in all of the figures.

1 represents a portion of the main frame of an arbor press embodying my invention, the upper part of the machine being shown in a co-pending application.

2 is the work supporting bracket or knee vertically adjustable on dovetail ways on the front of the frame.

3 is a circular rotative bed plate or disk fixed on a vertical shaft 13 rotative in the bracket. This bed has any convenient number of radial recesses 3* to receive arbors of various diameters and permit the work carried by the arbor to rest on the bed.

The frame 1 is provided on its front face with a rack 6 and pivoted on a clamping bolt 7 extending through the bracket is a lever 4. Pivoted in this lever are oppositely projecting pawls 8 and 9. These pawls are yieldably moved toward the rack and into engagement therewith by springs 17 and are stopped in this movement by shoulders 16 on the lever whereby when the lever is in horizontal or mid-position the pawls will each clear the rack, and the bracket will be free to slide vertically on the ways, the bolt 7 being adjusted to compress the bracket into frictional engagement with the ways sufficient to hold the bracket in adjusted position as it is moved step by step by operation of the lever. By moving the lever downward the lower pawl 8 engages the rack and forces the bracket upward by a toggle lever movement step by step as the lever is oscillated below mid-position. By moving the lever upward from mid-position the upper pawl 9 operates in like manner to move the bracket downward. When adjusted for use, to lock the bracket in adjusted position, the lever is moved downward to the limit as in Fig. 2. The pivot of the pawl 8 is thus thrown toward the rack beyond a line drawn from the axis of the bolt 7 on which the lever is pivoted to the end of the pawl engaging the rack and with the pawl in contact with the rack teeth near its pivot. The bracket is thus locked against any downward pressure that may be brought to bear upon the bed plate by operating the machine to press the arbor in or out of the work.

To rotate and hold the bed plate 3 the shaft 13 is provided at its lower end with a miter gear 14 connecting it with mechanism not shown for rotating and adjusting the bed plate, and forming no part of my present invention.

From the foregoing description the operation of the device is obvious without further explanation.

I do not herein claim the means for rotating and holding the bed plate but reserve the same for a separate application pursuant to requirement of division.

What I claim is:—

1. An arbor press, comprising a frame, a rack in the frame, a bracket slidable on the frame, a lever pivoted in the bracket, oppositely projecting pawls pivoted on the lever and alternately engaging the rack to oppositely move the bracket and means for frictionally engaging the bracket with the frame to yieldably hold the bracket in place on the frame.

2. An arbor press, comprising a frame, a rack and ways on the frame, a bracket slidable on the ways, a clamping bolt in the bracket to frictionally engage the bracket with the ways, a lever pivoted on the bolt, and oppositely projecting pawls pivoted on the lever to oppositely and alternately engage the rack to move the bracket on the ways.

3. An arbor press, comprising a frame, a bracket slidable on the frame, a lever pivoted in the bracket, oppositely projecting pawls on the lever alternately engaging the rack, shoulders on the lever to limit the movement of the pawls toward the rack, whereby when the lever is in mid-position both pawls are out of such engagement, springs to move the pawls toward the shoulders and rack and means for holding the bracket from moving when the pawls are both out of engagement with the rack.

4. An arbor press, comprising a frame, a bracket slidable on the frame, means for frictionally holding the bracket from sliding, a rack in the frame opposite the bracket, a lever pivoted in the bracket, and a pawl pivoted on the lever and engaging the rack, the lever and pawl operating as a toggle lever to move the bracket, and also arranged to carry the pivot of the pawl beyond a point in line between the pivot of the lever and the end of the pawl, whereby the bracket is locked in position.

In testimony whereof I affix my signature in presence of two witnesses.

WILLIAM E. ELLIOTT.

Witnesses:
HAROLD O. VAN ANTWERP,
MAE RANKIN.